(12) United States Patent
Geske

(10) Patent No.: US 9,328,875 B2
(45) Date of Patent: May 3, 2016

(54) SCALABLE LASER WITH SELECTABLE DIVERGENCE

(71) Applicant: FLIR Systems, Inc., Wilsonville, OR (US)

(72) Inventor: Jonathan Geske, Ventura, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 407 days.

(21) Appl. No.: 13/797,470

(22) Filed: Mar. 12, 2013

(65) Prior Publication Data

US 2015/0198295 A1 Jul. 16, 2015

Related U.S. Application Data

(60) Provisional application No. 61/616,320, filed on Mar. 27, 2012.

(51) Int. Cl.
| | |
|---|---|
| *G03B 21/00* | (2006.01) |
| *F21K 99/00* | (2016.01) |
| *F41G 1/35* | (2006.01) |
| *G02B 27/09* | (2006.01) |
| *G02B 27/20* | (2006.01) |
| *G02B 27/30* | (2006.01) |
| *F21Y 101/02* | (2006.01) |
| *G02B 5/02* | (2006.01) |

(52) U.S. Cl.
CPC ... *F21K 9/50* (2013.01); *F21K 9/90* (2013.01); *F41G 1/35* (2013.01); *G02B 27/095* (2013.01); *G02B 27/0905* (2013.01); *G02B 27/0938* (2013.01); *G02B 27/20* (2013.01); *G02B 27/30* (2013.01); *F21Y 2101/025* (2013.01); *G02B 5/02* (2013.01); *Y10T 29/49002* (2015.01)

(58) Field of Classification Search
CPC .......... F41G 1/35; G02B 26/00; G02B 27/09; G02B 27/20; G02B 27/30; G02B 5/02; F21K 99/00; H01S 5/40
See application file for complete search history.

(56) References Cited

U.S. PATENT DOCUMENTS

| | | | | |
|---|---|---|---|---|
| 6,000,813 | A * | 12/1999 | Krietzman | G02B 27/20 353/110 |
| 6,668,112 | B1 * | 12/2003 | Kaneda | G02B 6/4214 359/341.32 |
| 2002/0097587 | A1 * | 7/2002 | Krietzman et al. | 362/553 |
| 2006/0132725 | A1 * | 6/2006 | Terada et al. | 353/102 |
| 2008/0000133 | A1 | 1/2008 | Solinsky et al. | |
| 2008/0101429 | A1 * | 5/2008 | Sipes | G02B 6/4296 372/50.12 |
| 2009/0207467 | A1 | 8/2009 | Meyers et al. | |

FOREIGN PATENT DOCUMENTS

| | | |
|---|---|---|
| DE | 102009037979 | 2/2011 |
| DE | 102009037979 A1 * | 2/2011 |
| WO | WO 2013014809 | 1/2013 |

* cited by examiner

*Primary Examiner* — Sultan Chowdhury
*Assistant Examiner* — Danell L Owens
(74) *Attorney, Agent, or Firm* — Haynes and Boone, LLP

(57) ABSTRACT

A laser illuminator/pointer can have an array of diode lasers for providing laser beams. A beam shaping optic can shape each of the laser beams. A movable, substantially transparent window can be in a path of the laser beams. A plurality of diffusers can be disposed on the window and can be positioned to vary a divergence of at least one of the laser beams when the window is moved.

24 Claims, 14 Drawing Sheets

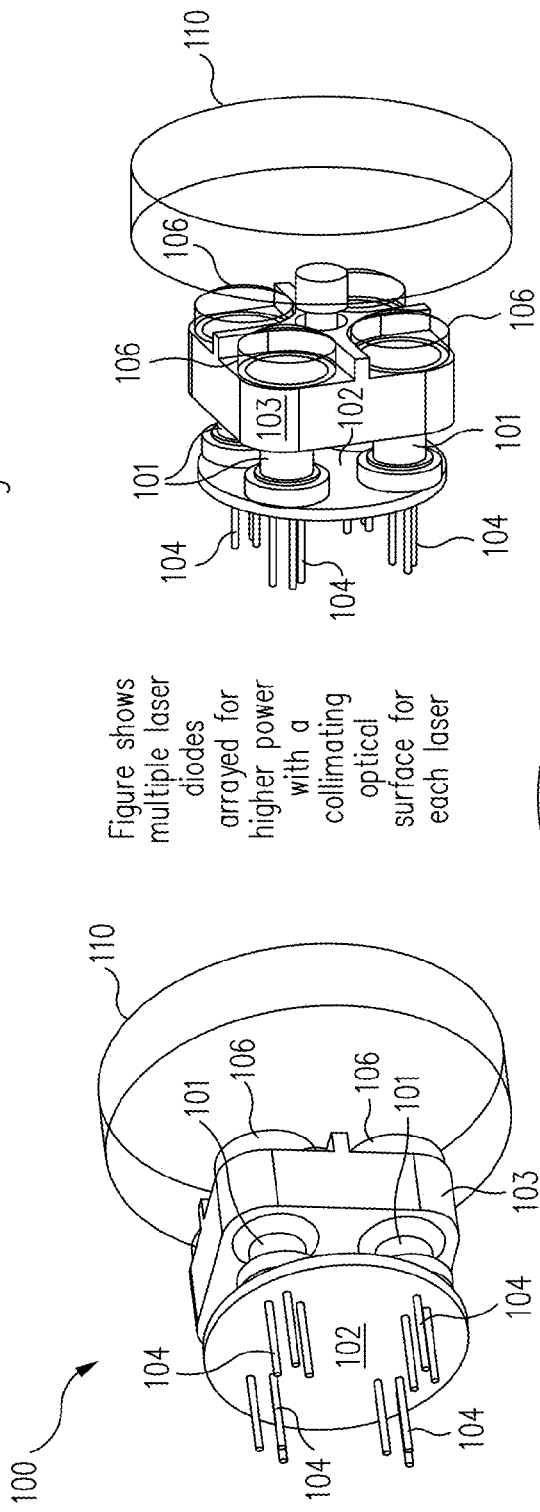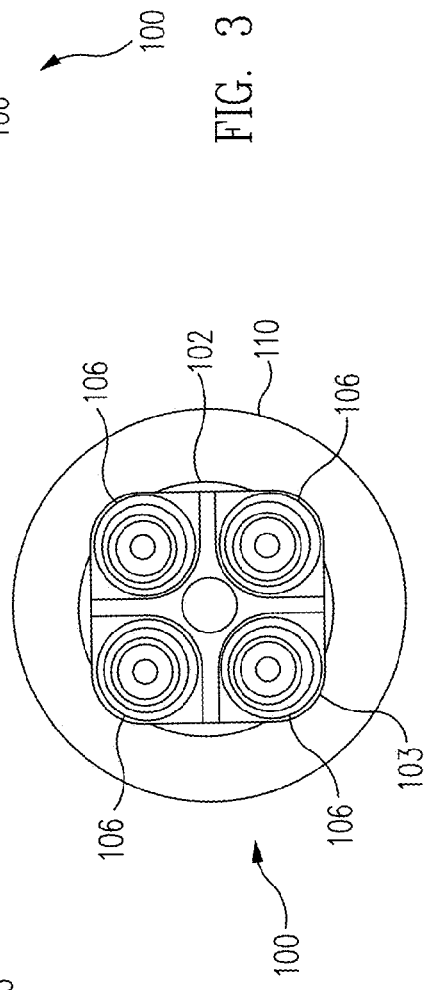

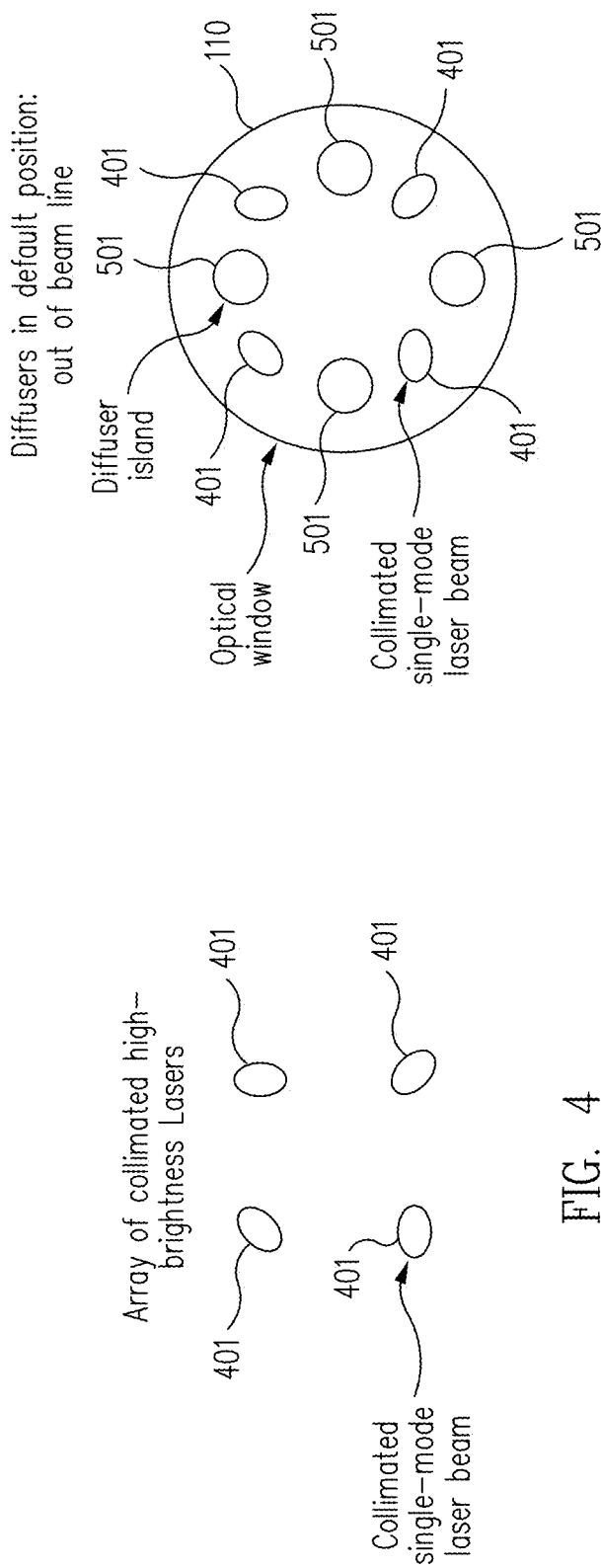

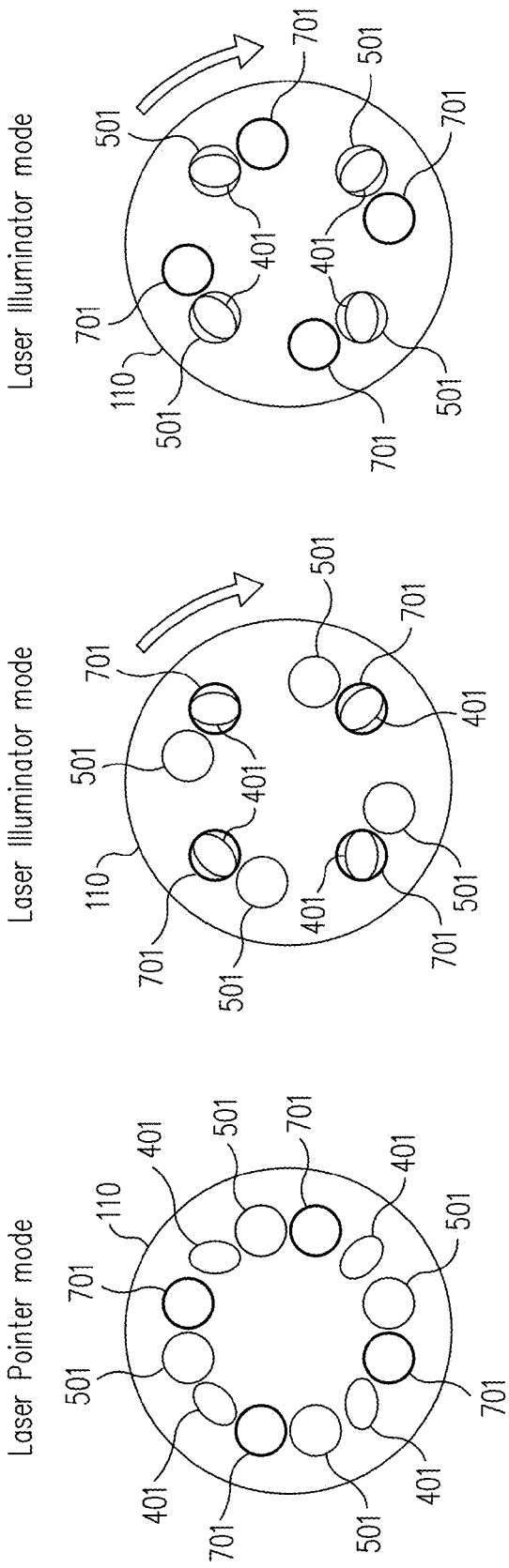

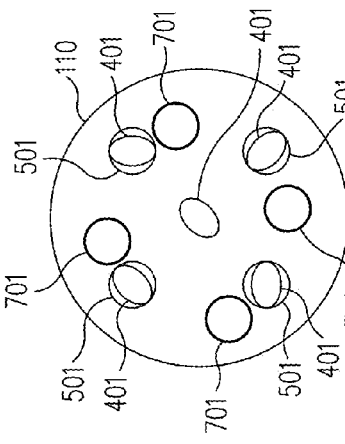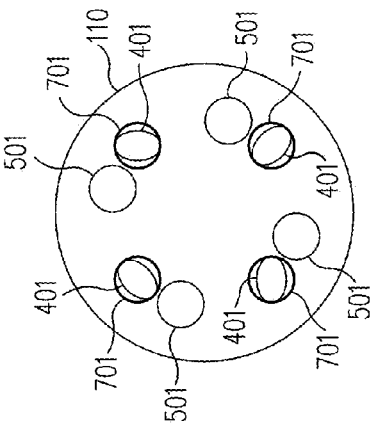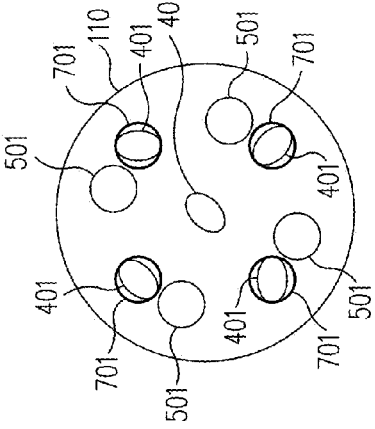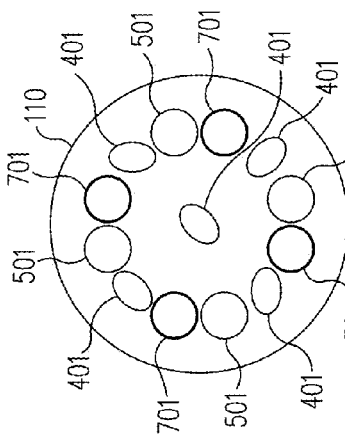

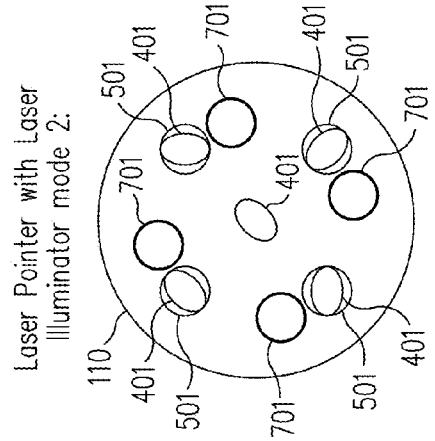
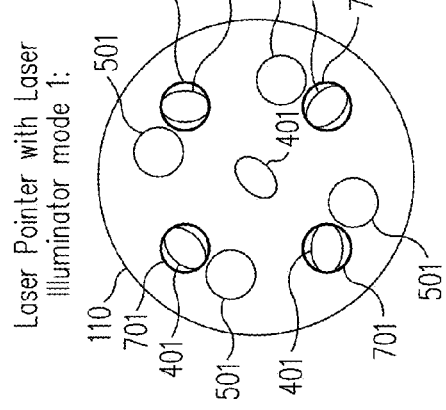
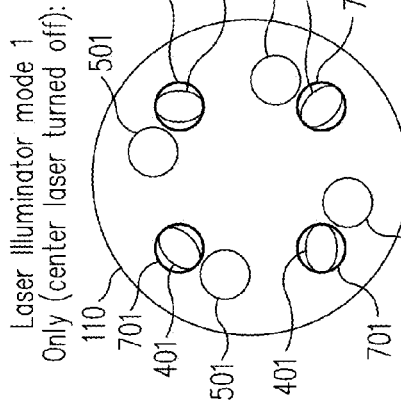
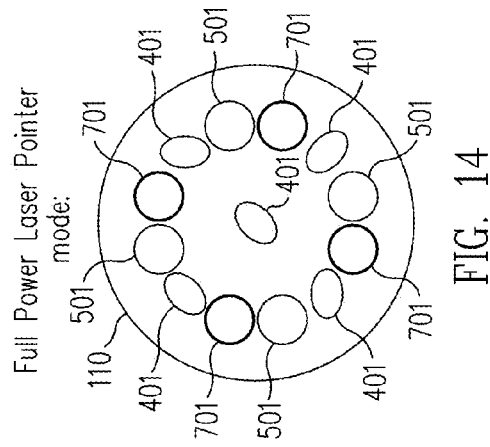

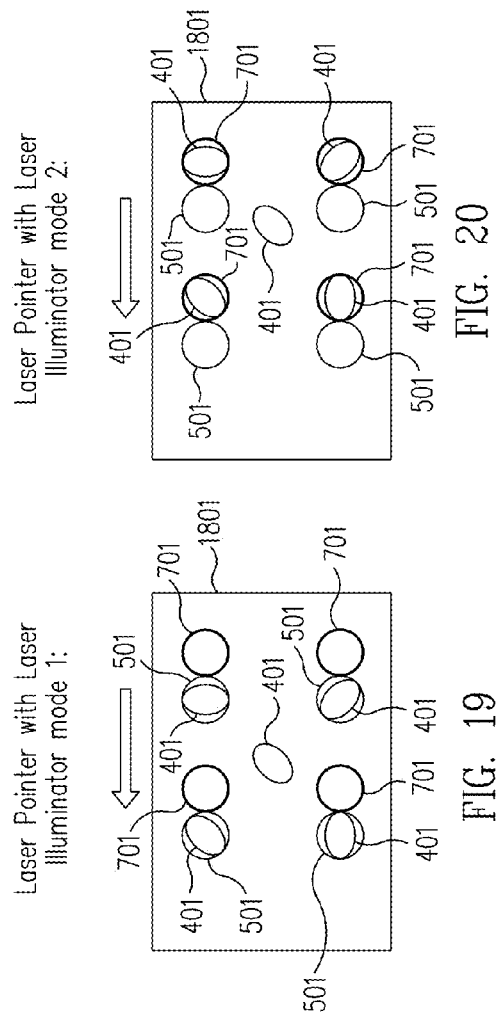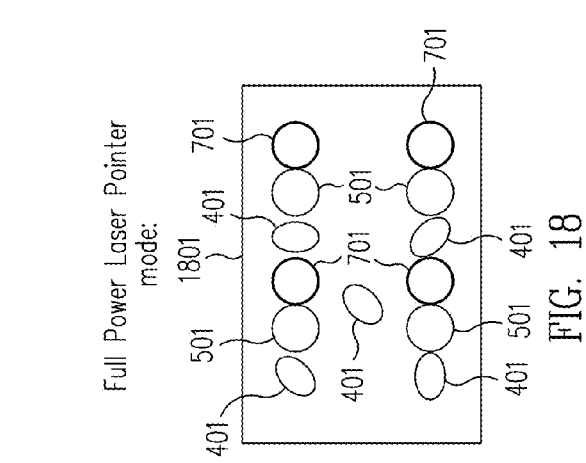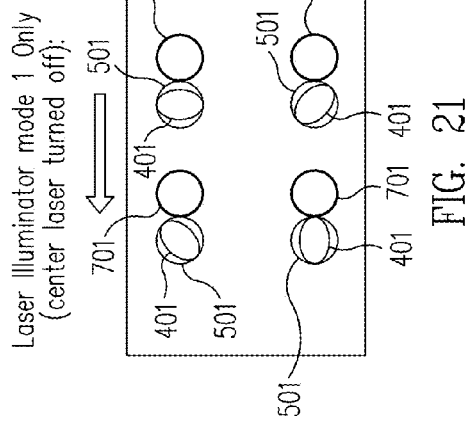

Linear array with rotating window

Tighter packing of laser beams with beam rotation

Rotating the fast axis enables tighter packing of laser beams

Without rotation (clipping):

With rotation (no clipping):

Photo of prototype laser pointer

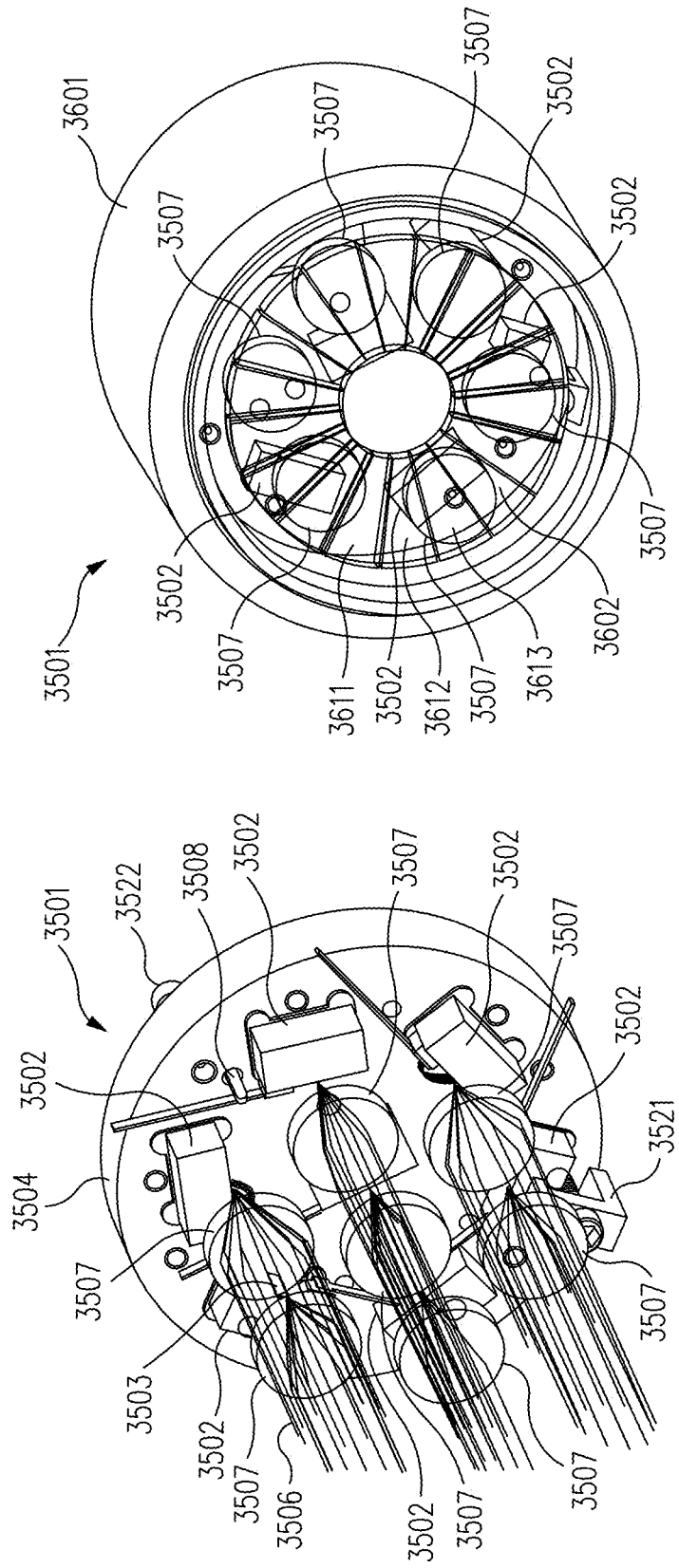

SCALABLE LASER WITH SELECTABLE DIVERGENCE

CROSS-REFERENCE TO RELATED APPLICATIONS

This patent application claims priority to and the benefit of U.S. Provisional Patent Application No. 61/616,320 filed Mar. 27, 2012, which is incorporated herein by reference in its entirety.

TECHNICAL FIELD

One or more embodiments of the invention relate generally to lasers and, more particularly, to a scalable laser array having selectable divergence for use in illuminators and pointers, for example.

BACKGROUND

Lasers can be used as illuminators and pointers. If brighter illumination or pointing is desired, then a higher power laser can sometimes be used.

When a higher power laser is used, then brighter illumination and a brighter pointing dot can be provided. However, the waste heat provided by higher power lasers becomes more problematic as the power level increases. The heat must be removed in order to avoid overheating of the laser. As a laser become hotter, its efficiency declines leading to reduced output power and overheating that can lead to laser failure. Thus, thermal considerations limit the amount of power that an illuminator or pointer can generally have.

SUMMARY

In accordance with one embodiment of the invention, a laser illuminator/pointer can include an array of diode lasers for providing a plurality of laser beams. A movable, substantially transparent window can be in a path of the laser beams. A plurality of diffusers can be disposed on the window and can be positioned to vary a divergence of at least one of the laser beams when the window is moved.

In accordance with another embodiment of the invention, a method can include determining a desired total power level of a laser device and determining a number of diode lasers required to provide the desired total power level. The number can be at least two and each diode laser can have approximately the same power. The diode lasers can be assembled into an array to partially define the laser device. The diode lasers can be aligned such that beams thereof define a laser spot at a predetermined far field distance from the diode lasers.

In accordance with another embodiment of the invention, a method can include providing electrical power to a plurality of diode lasers in an array to provide a corresponding plurality of laser beams, using an optic to shape the divergence of the beams, and moving a window through which the laser beams are transmitted. The window can be moved to position diffusers on the window to vary a divergence of at least one of the laser beams.

In accordance with another embodiment of the invention, a laser pointer can include a plurality of laser diodes. Each laser diode can have a fast axis. The fast axis of each laser diode can be aligned to provide laser spots proximate one another. The laser beams can be proximate one another at short ranges and can be substantially on-top of each other at long ranges. The fast axis of each laser diode can be oriented or aligned substantially differently from the fast axis of each other laser diode. In this manner, the laser spots can be more tightly packed without clipping and/or a more round or circular laser spot can be formed by combining laser beams. The centers of the individual laser spots can be substantially aligned (substantially on top of each other) in the far field.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

A higher power laser can be the same laser as a lower power laser, but can be operated at a lower overall drive power level so that the lower power laser produces less light and also less waste heat. A higher power laser can be a laser that has multiple transverse modes and hence requires a longer focal length lens to shape its output beam to the same beam divergence as a single mode laser (single-transverse mode laser). The term "higher power laser" is thus a relative term to describe lasers that produce more waste heat and/or require longer focal length lens systems to provide beam shaping to the same divergence as another lower power laser or a laser operated at a lower power.

BRIEF DESCRIPTION OF THE DRAWINGS

FIGS. 1-3 shows a scalable laser with selectable divergence, in accordance with an embodiment of the invention.

FIG. 4 shows laser spots produced by an array of beam shaped, high-brightness lasers, in accordance with an embodiment of the invention.

FIG. 5 shows a plurality of diffusers in a default, e.g., out of the beam paths, position on a window, in accordance with an embodiment of the invention.

FIGS. 7-9 show a window having diffusers for a three mode device, in accordance with an embodiment of the invention.

FIGS. 10-17 show a window having diffusers for a three mode illuminator and having a laser pointer beam in the center, in accordance with an embodiment of the invention.

FIGS. 18-21 show a slide-in diffuser in various states of operation, in accordance with an embodiment of the invention.

FIGS. 35 and 36 show a multi-element pointer illuminator, in accordance with an embodiment of the invention.

Embodiments of the invention and their advantages are best understood by referring to the detailed description that follows. It should be appreciated that like reference numerals are used to identify like elements illustrated in one or more of the figures.

DETAILED DESCRIPTION

Figure 6:
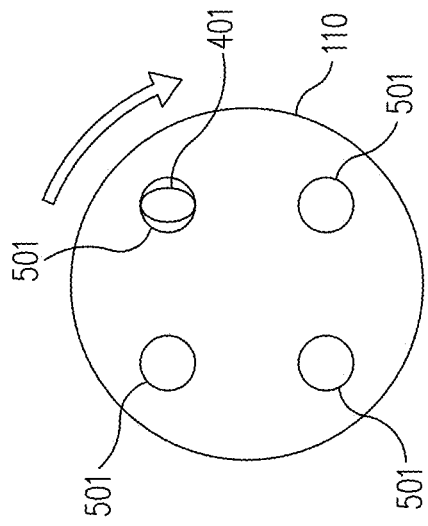
FIG. 6 shows the diffusers of FIG. 5 rotated 45 degrees into the beam paths, in accordance with an embodiment of the invention.

Methods and systems are disclosed for providing increased power for laser illuminators, laser pointers, and the like. According to an embodiment, increased power is provided by using an array of laser diodes instead of a single, higher power, laser diode.

The design is readily scalable to provide a desired brightness or power. The brightness or power can be scaled by changing the number of lasers of the array. Such scalability cannot be provided by merely changing the power of a single laser due to the constraint imposed upon laser diode power discussed herein.

By using an array of separate laser diodes instead of a single, larger, laser diode, lower power laser diodes can be used to obtain the same total power or brightness. Such lower power laser diodes are more thermally efficient. That is, less waste heat is provided by the array of laser diodes than by the single, higher power laser diode to provide the same brightness. The lower power lasers each require a smaller diameter and shorter focal length lens to individually achieve the same level of beam shaping as a higher power laser because higher power lasers are multimode lasers. A multi-mode laser can be defined as a laser with multiple transverse modes. Hence by providing multiple smaller lasers, a smaller diameter beam shaping system can be achieved, and the overall focal length of the lenses in the assembly is shorter.

A simple heat sink can be used for cooling the laser. Active cooling is not needed. Using a single laser to provide the same total power would typically require active cooling. Thus, design and construction are substantially simplified. Small lasers are more efficient at electrical to optical power conversion and thus facilitate the construction of a more efficient system.

The divergence of one or more of the laser beams can be controlled by using diffusers. One or more diffusers can be moved into and out of the path of the laser beam(s) to provide a desired amount of divergence. Thus, the size of a laser spot used for pointing can be varied and the size of the area being illuminated can be varied.

As those skilled in the art will appreciate, diode lasers typically have astigmatic or elliptical beams that produce astigmatic or elliptical laser spots. The fast axis of such lasers is the more rapidly diverging axis of the laser beam emitted from the laser diode. The fast axes of the lasers can be rotated with respect to one another so that the laser spots can be more tightly packed without clipping. That is, the fast axes of the lasers can be oriented at different angles with respect to each other. Rotating the fast axes can also provide a more round or circular laser spot when the laser beams are combined. Thus, image artifacts from the fast axis and the engineered diffuser can be washing out or mitigated by rotating the fast with respect to other lasers in the array, as discussed below.

Space can be provided between the beam shaped laser beams for the diffusers. Thus, rotation or translation of the window can move the diffuser out of this space and into the paths of the laser beams.

According to an embodiment, a combination laser illuminator and pointer is provided. The combination laser illuminator and pointer can be used in a variety of different applications. For example, in a gun sight, the laser illuminator can be used much like a flashlight to illuminate the target, such as for location and identification of the target. The laser pointer can then be used to aim the gun. The laser pointer feature and the laser illuminator feature can be used simultaneously, such that the target can be illuminated while aiming the gun. The ability to select the divergence of the illuminating lasers can allow the user to vary the intensity of the illumination and size of the illuminated area.

FIGS. 1-3 show a scalable laser 100 with selectable divergence, in accordance with an embodiment of the invention. The scalable laser 100 can have a plurality of separate lasers, such as diode lasers 101. The lasers 101 can define an array. Any number of lasers 101 can be used. For example, the scalable laser 100 can have 2, 3, 4, 5, 6, 8, or more separate lasers 101. The array can have any desired configuration. For example, the array can be square, rectangular, triangular, or circular.

The scalability of the scalable laser 100 allows for a desired brightness or power to be provided. The total desired power can be divided by the power of the separate, lower power, lasers 101 to determine the number of separate, lower power, lasers 101 to be used in the scalable laser 100. By using a plurality of separate, lower power, lasers 101, better thermal efficiency can be achieved. Thus, higher brightness lasers 101 can be used and the lasers 101 can be beam shaped to provide a laser beam with more laser energy per unit angle. The individual beams of the lasers 101 can be combined into a higher power beam with enhanced beam shaping. Thus, the lasers 101 can be aligned to form a single laser spot on the target at a distance.

The lasers 101 can be either single mode or multi-mode lasers 101. Single mode laser 101 can be used where a smaller, brighter, laser spot is desired. Lasers 101 having nearly $M^2=1$ beams can be used to facilitate the use of small beam shaping optics with very short focal lengths and small diameters.

Beam shaping optics, as the term is used herein, can include but are not limited to, fast axis collimators, spherical and aspheric collimating lenses, engineering diffusers, holographic optics, micro-lenses, diverging lenses, prisms, wedges, remapping diffusers, quarter-wave plates, or any other element that modifies the laser beam divergence and/or beam shape.

The total length of the beam shaping and diffusing systems can be substantially reduced. This length does not increase as more lasers are added.

The lasers can have any desired power or combination of powers. For example, the laser can be 10 mW lasers, 200 mW lasers, 300 mW lasers, 500 mW lasers, 1 Watt lasers, 2 Watt lasers, or more powerful lasers.

The lasers 101 can have any desired frequency or combination of frequencies. Providing different frequencies for the lasers 101 can mitigate beam shaping artifacts and enhance reflections (such as off of targets to provide better illumination). Rotating the fast axes also mitigates beam shaping artifacts, as discussed herein. It also enhances reflection due to rotated polarization angle that consequently occurs.

Thus, multiple laser frequencies can be used in the scalable laser 100. Each laser 101 can have a dedicated beam shaping optic 106 and one or more diffusers such that each laser 101 can provide a different frequency and/or divergence angle. The beam shaping optics 106 can perform beam shaping for the lasers 101 in both the fast axis and the slow axis. The laser beams can be aligned so as to be substantially parallel with respect to one another and so as to substantially overlap in the far field. The total power of the combined laser beams is nominally the same as the sum of the powers of the individual laser beams. The total divergence is nominally the same as the divergence of each laser 101 in the array. Thus, the laser power is generally summed over the separate lasers 101, while the divergence is not.

The position of the beam shaping optics 106 can be fixed. Thus, the position of the beam shaping beam shaping optics 106 need not change, such as for different modes of operation of the scalable laser.

The lasers 101 can be vertical-cavity surface emitting lasers (VSEL), edge emitting lasers, or diode pumped lasers, for example. Lasers other than diode lasers can be used. Any desired type of laser can be used.

Each laser 101 can have a dedicated beam shaping optics 106. Using single mode laser 101 can facilitate the use of smaller, generally less expensive, beam shaping optics 106.

The plurality of lower power, separate, lasers 101 tend to operate over a wider temperature range (as compare to a single, higher power, diode laser) because the waste heat is spread between multiple laser die. When a single, higher power diode laser is used, then the waste heat is concentrated at the single laser die. Thus, the single, higher power diode laser is more prone to overheating.

The lasers 101 can be mounted upon a printed circuit board (PCB) 102 or the like. A heat sink 103 can be attached to the lasers 101 to facilitate the removal of waste heat therefrom.

Each laser 101 can have a plurality of electrical contacts or pins 104 to provide electrical connection thereto. The pins 104 can extend through the printed circuit board 102.

The use of a plurality of laser 101 can provide more incoherent laser light on the target. The use of a plurality of lasers 101 can provide a wider spectral bandwidth of laser light on the target. The increased incoherent laser light and wider spectral bandwidth can mitigate the occurrence of undesirable coherent interaction of the laser light, such as that which causes speckle and image artifacts. The use of a wider bandwidth can improve illumination for some targets.

The fast axis of each laser 101 can be offset or rotated with respect to each other laser 101. Thus, the laser spots from the lasers 101 can be more tightly packed (see FIG. 28) and/or a single laser spot from by the lasers 101 can appear to be more round or circular. In this manner, the use of circularizers for each laser 101 can be avoided.

Rotating the fast axis can vary the polarization among the lasers 101 to provide a richer beam appearance. Rotating the fast axis can enhance illumination, such as by providing better reflection from some objects.

A window 110 can be place in front of the lasers 101 such that the window 110 is in the beam path of at least one of the lasers 101. The window can be transparent at the wavelength of the lasers 101 or can have transparent portions formed therein. The window 11C can have diffusers to increase the spread or divergence of light from one or more of the lasers, as discussed herein and shown in FIGS. 6-27. The window 110 can define a plane of diffusers and at least some of the diffusers can provide different amounts of dispersion. The diffusers can be discrete islands in the window 110. The diffusers can be sections of the window 110, such as wedges of a round window 101. The diffusers can have any desire configuration. The diffusers can be moved into and out of the laser beams to vary the divergence of the laser beams, such as for more controlled illumination.

The window 110 can be a glass window. The diffusers can be formed into or upon the window. For example, the diffusers can be ground or etched into the window 110 or the diffusers can be glued to the window 110. The diffusers can be ground glass diffusers, engineered diffusers, or any other type of diffusers. The diffusers can be lenses, such as convex or concave lenses, e.g., can be positive or negative power lenses.

FIG. 4 shows laser spots 401 produced by the array of beam shaped, high-brightness lasers, such as the lasers 101, in accordance with an embodiment of the invention. The fast axes of the laser spots 401 are rotated with respect to one another. That is, the fast axes are at different angles or orientations for each laser spot 401.

Various configurations of windows and diffusers are contemplated. Examples of some such configuration are discussed with reference to FIGS. 5-27 below. Many other configurations can be used.

FIG. 5 shows a plurality of diffusers 501 in a default, e.g., out of the beam paths, position on the window 110, in accordance with an embodiment of the invention. The laser beams 401, as shown by laser spots 401 (both the laser beams and their resultant laser spots are referred to by the number 401 herein), are not incident upon the diffusers 501 and thus are not diffused thereby. Thus, the laser beams 401 will have a comparatively tight, or low-divergence, beam shape, such as may be used for pointing.

FIG. 6 shows the diffusers 501 of FIG. 5 rotated 45 degrees into the paths of laser beam 401, in accordance with an embodiment of the invention. The laser beams 401 are diffused by the diffusers 501, thus increasing the divergence of the laser beams. Any desired amount of divergence can be provided by the diffusers 501. The diffused laser beams carne used for illumination, for example. It is worthwhile to note the intentional spacing between the lasers that allows for placement of diffusers 501 such that he simple rotation of the window 11 moves the diffusers 501 into the optical path.

FIGS. 7-9 show the window 110 having diffusers for a three mode device, in accordance with an embodiment of the invention. The first mode is a pointer mode and is shown in FIG. 7. The second mode is an illuminator mode and is shown in FIG. 8. The third mode is another illuminator mode and is shown in FIG. 9. The two illuminator modes of FIGS. 8 and 9 can have different divergences of the laser beams, such as by using different diffusers 501 and 701, as discussed herein.

In the laser pointer mode of FIG. 7, the laser beams 401 do not pass though either of the diffusers 501 and 701. Rather, the laser beam 401 pass though a transparent portion of the window 110 that does not appreciably alter the laser beams 401. The laser beams 401 thus have minimal divergence, such as for use in pointing.

In the illuminator mode of FIG. 8, the laser beams 401 pass though the diffusers 701 and thus have one divergence, e.g., a medium divergence. The laser beams 401 can thus be used for narrower angle illumination.

In the illuminator mode of FIG. 9, the laser beams 401 pass though the diffusers 501 and thus have another divergence, e.g., a wider divergence. The laser beams 401 can thus be used for wider angle illumination.

FIGS. 10-17 show a window 110 having diffusers for a three mode illuminator and having a laser pointer beam 401 in the center of the window 110, in accordance with an embodiment of the invention. In FIG. 10, all of the laser beams 401 are turned on and none of the laser beams 401 pass through any of the diffusers 501 and 701 such that full power, minimal divergence laser pointing is facilitated.

In FIG. 11, the center laser beam 401 is turned on and the other four laser beams 401 pass through the diffusers 701 such that one level of divergence is provide for illumination while pointing is also facilitated. In FIG. 12, the center laser beam 401 is turned on and the other four laser beams 401 pass through the diffuses 501 such that another level of divergence is provide for illumination while pointing is also facilitated. In FIG. 13, the center laser beam 401 is turned off and the other four laser beams 401 pass through the diffuses 701 such that illumination is facilitated, but not pointing.

FIGS. 18-21 show a slide-in diffuser 1801 in various states of operation, in accordance with an embodiment of the invention. The window 110 of FIGS. 6-13 rotates to move the diffusers 501 and 701 into and out of the paths of the laser beams 401. The slide-in diffuser 1801 slides or translates to move the diffusers 501 and 701 into and out of the paths of the laser beams.

FIG. 18 shows none of the laser beams 401 passing through the diffusers 501 and 701. FIG. 19 shows the center laser beam 401 not passing though the diffusers 501 and 701 and shows the other laser beams 401 passing through the diffusers 501. FIG. 20 shows the center laser beam 401 not passing though the diffusers 501 and 701 and shows the other laser beams 401 passing through the diffusers 701. FIG. 21 shows the center laser beam 401 turned off and shows the other laser beams 401 passing through the diffusers 701.

In FIG. 18 the laser beams 401 cooperate to provide a laser pointer. In FIGS. 19 and 20 the center laser beam 401 can be used as a pointer while the other laser beams 401 provide illumination with different degrees of divergence between the configuration of FIG. 19 and FIG. 20.

Figure 24:
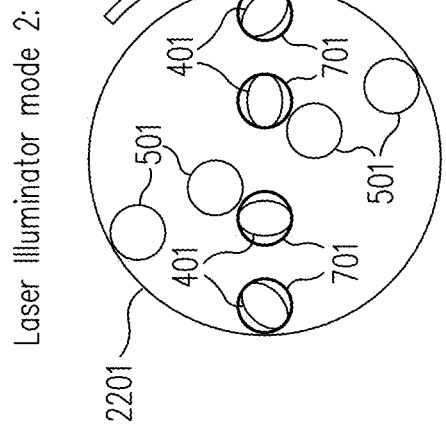
FIGS. 22-24 show a linear array with a rotating window in various states of operation, in accordance with an embodiment of the invention.
Figure 23:
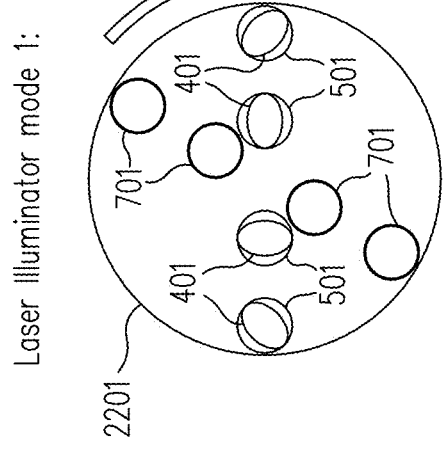
Figure 22:
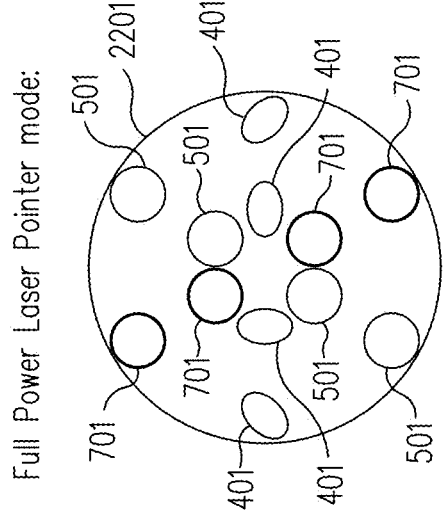

FIGS. 22-24 show a linear array with a rotating window 2201 in various states of operation, in accordance with an embodiment of the invention. The laser beams 401 are aligned in single horizontal line or linear array. Rotating the window 2201 moves the diffusers 501 and 701 into and out of the paths of the laser beams.

In FIG. 22 none of the laser beams 401 pass though the diffusers 501 and 701. In FIG. 23 all of the laser beams 401 pass though the diffusers 501. In FIG. 24 all of the laser beams 401 pass through the diffusers 701.

Figure 25:
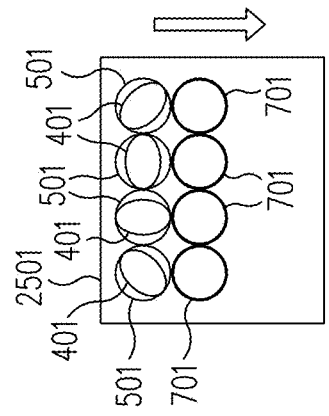
FIGS. 25-27 show a linear array with a slide-in window in various states of operation, in accordance with an embodiment of the invention.
Figure 26:
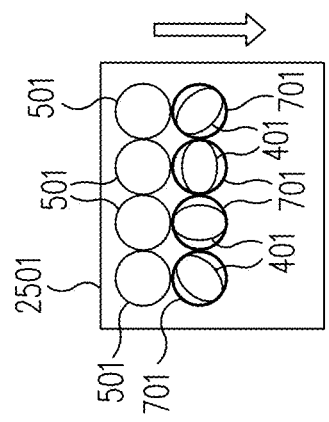
Figure 27:
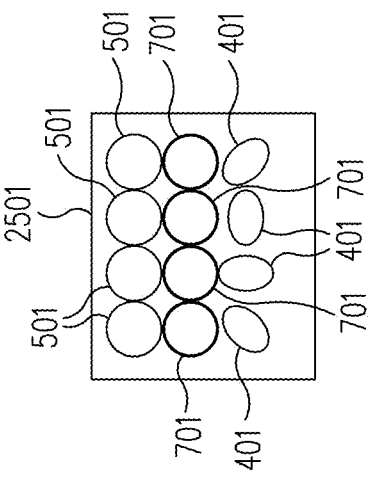

FIGS. 25-27 show a linear array of laser beams 401 with a linear array of diffusers 501 and 701 on a slide-in window 2501 in various states of operation, in accordance with an embodiment of the invention. In FIG. 25, the laser beams 401 do not pass though the diffusers 501 and 701. In FIG. 26, the laser beams 401 pass through the diffuser 701. In FIG. 27, the laser beams 401 pass though the diffusers 501.

Figure 28:
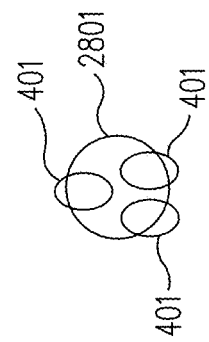
FIG. 28 shows tighter packing of the laser beams resulting from using beam fast axis rotation, wherein no clipping of the beams occurs, in accordance with an embodiment of the invention.

FIG. 28 shows tighter packing of the laser beams 401 resulting from using fast axis rotation, wherein no clipping of the laser beams 401 occurs, in accordance with an embodiment of the invention. Clipping can occur when the laser beams 401 pass through an aperture, such as that represented by circle 401. The fast axes of the laser beams 401 are all rotated with respect to one another (they point in different directions). All three of the laser beams 401 fit within the circle 2801.

Figure 29:
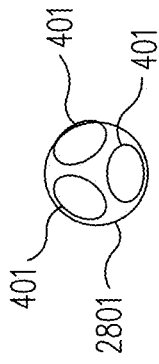
FIG. 29 shows looser packing of the laser beams resulting from not using fast axis beam rotation, wherein clipping of the beams occurs, in accordance with an embodiment of the invention.

FIG. 29 shows looser packing of the laser beams 401 resulting from not using fast axis beam rotation, wherein clipping of the beams occurs, in accordance with an embodiment of the invention. The fast axes of the laser beams 401 are all aligned with respect to one another. The three of the laser beams 401 do fit within the circle 2801. That portion of the laser beams 401 not within the circle 2801 would be clipped by an aperture represented by the circle 2801.

Figure 30:
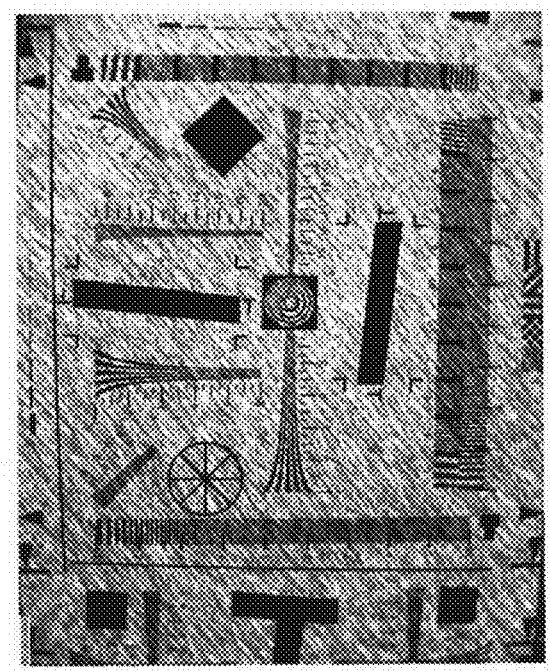
FIG. 30 shows an image having artifacts due to illumination with a single laser and diffuser (showing the problem with typical illuminators which only use one laser with an engineered diffuser), in accordance with an embodiment of the invention.

FIG. 30 shows an image having artifacts due to illumination with a single laser and diffuser, in accordance with an embodiment of the invention. For example, the diagonal lines or hash is an artifact associated with the fast axis of the single laser.

Figure 31:
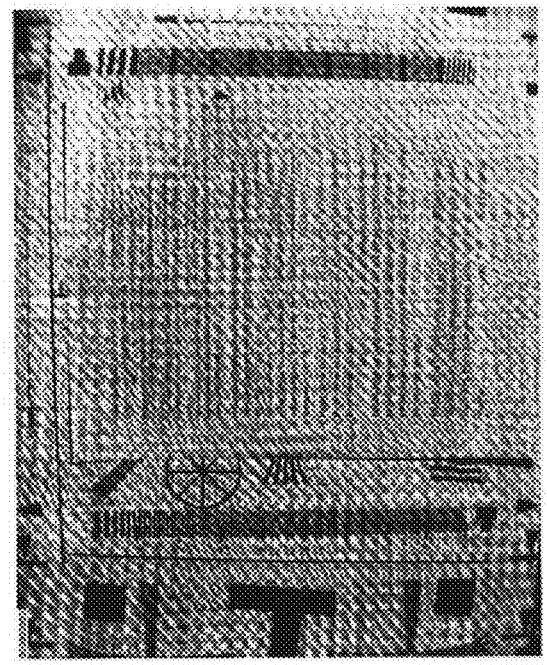
FIG. 31 shows the image of FIG. 30 with text (showing the problem with typical illuminators which only use one laser with an engineered diffuser), in accordance with an embodiment of the invention.

FIG. 31 shows the image of FIG. 30 with text, in accordance with an embodiment of the invention. The text is illegible due to the artifacts.

Figure 34:
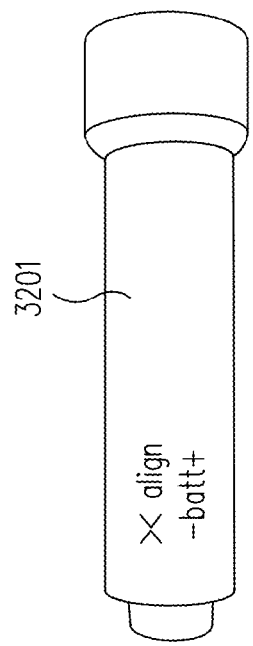
FIGS. 32-34 show a prototype of a laser pointer, in accordance with an embodiment of the invention.
Figure 33:
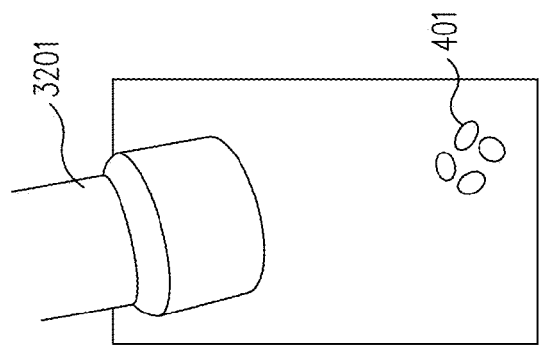
Figure 32:
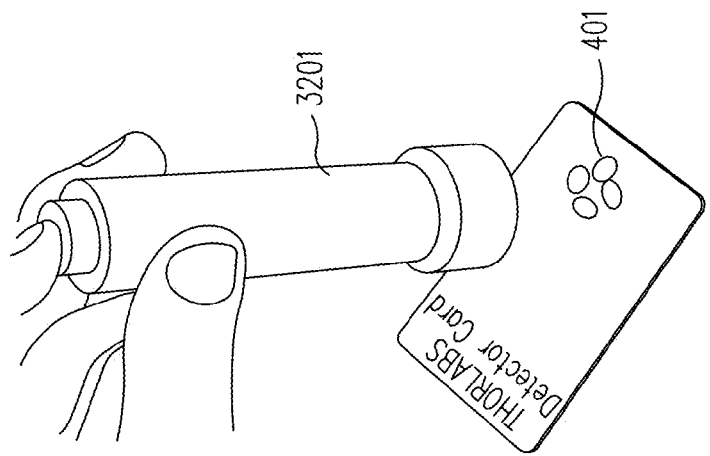

FIG. 32-34 show a prototype of a laser pointer 3201, in accordance with an embodiment of the invention. The laser pointer produces laser spot or beams 401. The laser beams 401 are oriented such that their fast axes are rotated (not aligned) with respect to one another. This was done to produce a rounder beam at a distance when the beams overlap. A diffuser can be placed over the array to wash out the fast-axis image artifacts. The four lasers of the laser pointer 3201 can be aligned such that at a predetermined distance from the laser pointer 3201, the laser beams 401 overlap. Since the fast axes of the laser beams 401 are rotated with respect to one another, the single laser spot formed by overlapping laser beams 401 can appear substantially round instead of oblong (as would occur with aligned fast axes of the laser beams 401).

FIGS. 35 and 36 show a multi-element pointer illuminator 3501, in accordance with an embodiment of the invention. FIG. 35 shows seven laser packages 3502, each having a diode laser 3503 mounted thereon. The laser packages 3502 can contain electronics associated with the lasers 3503 and can provide a thermal path from diode lasers 3503 to a heat sink 3504. The laser beams 3506 can pass though beam shaping optics 3507. The heat sink 2501 can measure approximately 30 mm by 2.5 mm, for example.

A screw clamp 3521 can hold each laser package 3502 in place during assemble, such as when the laser package 3502 is being attached to the heat sink 3504 via adhesive bonding or via fasteners. A plurality of screws 3522 can attach the printed circuit board to the heat sink 3504.

As shown in FIG. 36, a housing 3601 can substantially cover the heat sink 3504, laser packages 3502, and related components of FIG. 25. A rotatable window 3602 can have diffusers formed as wedges, much like the slices of a pie. For example, the window 3602 can have non-diffuser wedges 3611, first diffusers 3612, and second diffusers 3613. The first diffusers 3612 and the second diffusers 3613 can provide different amounts of spread or divergence. The first diffusers 3612 and the second diffusers 3613 can be ground glass diffusers, engineered diffusers, or any other type of diffusers.

A circuit board 102 (FIGS. 1-3) can provide control and drive electronics and can be located on the back of the heat sink 3504. One or more pins 3508 can extend from the circuit board through the heat sink 3504 to provide electrical connection between the circuit board and the laser packages 3502.

Figure 37:
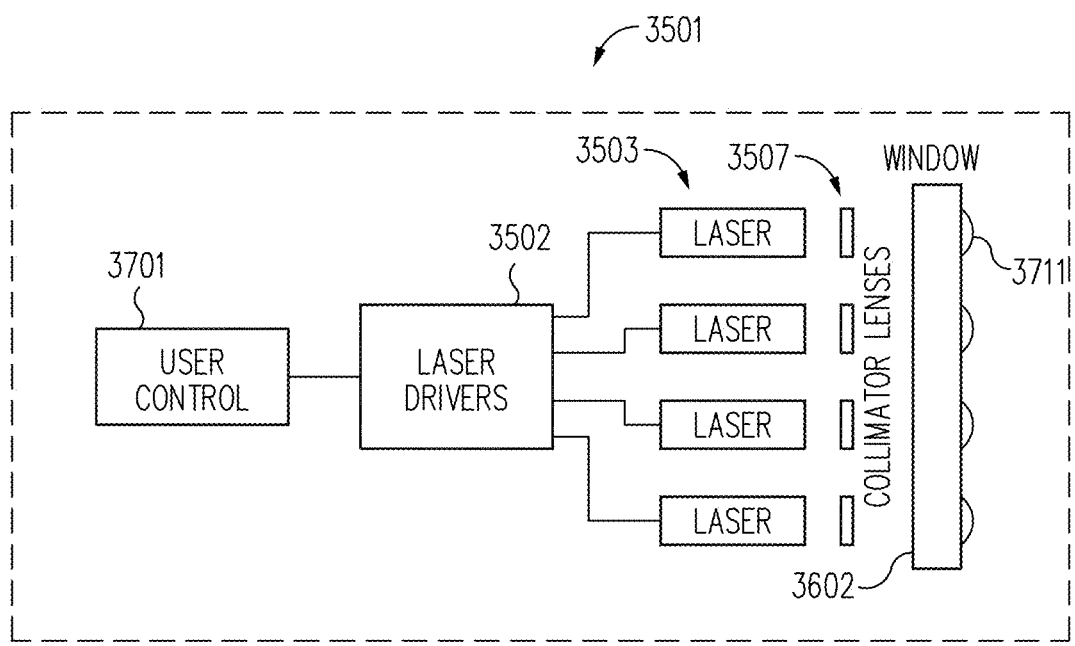
FIG. 37 is a block diagram showing a scalable laser with selectable divergence (via either slide in or rotatable diffusers), in accordance with an embodiment of the invention.

FIG. 37 is a block diagram showing a scalable laser with selectable divergence, in accordance with an embodiment of the invention. An user control 3701 provide a control signal to laser driver 3502 that provide power to diode lasers 3503. The diode lasers 3503 provide laser beams that pass through the beam shaping optics 3507 and the window 3602, as discussed herein. The window 3602 can be either rotatable or slide-in. Diffusers 3711 can be formed on the window, as discussed herein.

The user control 3701 can be a manual switch, such as a push button or slide switch. The user control 3701 can include a microprocessor. The user control 3701 can determine whether the scalable laser 3501 is on and can determine the mode of the scalable laser 3501. The modes can include pointer only, illumination only, as well as pointer and illumination. The modes can also determine the amount of divergence of at least some of the laser beams 401, such as those used for illumination.

One or more fixed diffusers can be used, either in place of the window 100 or in addition thereto. The fixed diffusers can provide a generally fixed amount of divergence for one or more of the lasers 101.

Using plural lasers facilitates scaling to achieve a desired total power. That is, the number of lasers can be varied to provide the desired total power. For example, more lasers and beam shaping optics can be added to the array to provide more total power. This can be done without substantially altering the architecture of the scalable laser. The lasers can all be packaged the same to facilitate such scalability. No additional telescopes, other than the individual beam shaping optics, are needed to add additional lasers. Typically, no telescope is used with the scalable laser, although telescopes may be used if desired.

Generally, the pointer divergence will be unchanged at longer distances. Generally, the illumination pattern will be unchanged at long distances.

Astigmatism can be mitigated by rotating the fast axes of the laser with respect to one another. Thus, a more desirable, more round laser spot can be produced in the far field. Astigmatism correction or circularization is not required.

Image artifacts, such as those due to laser interaction of the laser beam with the diffuser can be reduced by having the plurality of laser beams overlap at the target. Such overlapping of the laser beams tends to wash out the image artifacts produces by individual laser beams.

Embodiments of the invention can use less expensive, lower power lasers that are less prone to overheating. Embodiments of the invention can use less expensive, shorter optics. Generally, no telescope and not circularizers are needed according to embodiments of the invention. However, one or more telescopes and circularizers can be used, if desired.

It is worthwhile to appreciate that a telescope is different from beam shaping optics. A telescope is a beam expanding optical assembly used to reduce the beam divergence or to alter a beam divergence of a laser. Typically, a single high power collimated laser is used with a zoom telescope to make point/illuminators. Embodiments of the invention do not require a telescope.

Although diode lasers are discussed herein, such discussion is by way of example only and not by way of limitation. Various different types of lasers can be used according to embodiments of the invention.

The term "far field", as used herein, can be defined as a distance that is many times farther away from the lasers than the width of the laser beams. The term "far field", as used herein, can refer to a distance from the lasers that is sufficient for a specified optical effect to occur. For example, when the optical effect is the combining of a plurality of elongated laser beams having, rotated fast axes so as to produce a single, generally circular, laser spot, then the far field distance can be the distance from the lasers at which the laser spot from the combined beams appears to be generally circular. The far field distance is generally more than a few meters.

The term "array" as used herein can include any shape or configuration. An array can be either regular (square, rectangular, circular, linear, etc.) or irregular (not corresponding to any particular geometric shape).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected is:

1. A device comprising:
   an array of diode lasers for providing laser beams;
   beam shaping optics for each diode laser; and
   wherein a fast axis of each of the diode lasers is rotated with respect to the fast axis of each of the other diode lasers such that a far-field laser spot formed by all of the diode lasers appears more circular than a laser spot formed by one of the diode lasers.

2. The device of claim 1, further comprising:
   a movable, substantially transparent window in a path of the laser beams; and
   a plurality of diffusers on the window that are positioned to vary a divergence of at least two of the laser beams substantially simultaneously when the window is moved.

3. The device of claim 2, wherein the diffusers are positioned on the window such that when the window is in a first position the diffusers are not in the paths of any of the laser beams and such that when the window is in a second position at least two of the diffusers is in the path of at least two of the laser beams.

4. The device of claim 2, wherein the window is generally circular and is configured to rotate to vary the divergence of at least two of the laser beams.

5. The device of claim 2, wherein the window is generally rectangular and is configured to translate to vary the divergence of at least two of the laser beams.

6. The device of claim 2, wherein the window is configured to vary the divergence of at least two of the laser beams while not varying the divergence of at least one other of the laser beams.

7. The device of claim 2, wherein the window is configured to vary the divergence of at least two of the laser beams by a plurality of different amounts.

8. The device of claim 1, further comprising a fixed diffuser positioned to vary a divergence of at least one of the laser beams.

9. The device of claim 2, wherein the diffusers are ground glass diffusers and/or engineered diffusers.

10. The device of claim 1, wherein each fast axis of the diode lasers is rotated to be substantially perpendicular to a radius of the far field circular laser spot passing through a center of the corresponding beam.

11. The device of claim 2, wherein at least one of the diode lasers is configured to facilitate pointing.

12. The device of claim 2, wherein at least two of the diode lasers is configured to facilitate illumination, and wherein the diode lasers are configured with different frequencies to provide a wider spectral bandwidth than a single diode laser to reduce beam shaping artifacts and/or speckle.

13. The device of claim 2, wherein at least one of the diode lasers is configured to facilitate pointing, at least two of the diode lasers is configured to facilitate illumination.

14. The device of claim 1, wherein the beam shaping optics comprise a collimator.

15. The device of claim 1, wherein the device comprises a laser pointer.

16. A method comprising:
   determining a desired total power level of a laser device;
   determining a number of diode lasers required to provide the desired total power level, wherein the number is at least two and each diode laser has approximately the same power;
   assembling the number of diode lasers into an array to partially define the laser device; and
   aligning the number of diode lasers such that beams thereof overlap substantially to define a laser spot at a predetermined far field distance from the diode lasers, wherein a fast axis of each of the diode lasers is rotated with respect to the fast axis of each of the other diode lasers such that the far field laser spot defined by all of the diode lasers appears more circular than a laser spot formed by one of the diode lasers.

17. The method of claim 16, wherein the diode lasers are aligned such that the beams thereof at least partially coincide at the predetermined far field distance.

18. The method of claim 16, wherein each fast axis of the diode lasers is rotated to be substantially perpendicular to a radius of the far field circular laser spot passing through a center of the corresponding beam.

19. The method of claim 16, further comprising:
   placing a window proximate the diode lasers in a path of beams of the diode lasers; and
   wherein the widow has a plurality of diffusers thereon such that movement of the window varies a divergence of at least two of the beams substantially simultaneously.

20. The method of claim 16, wherein the laser device is a laser illumination device.

21. The method of claim 16, wherein the laser device is a laser pointing device.

22. The method of claim 16, wherein the laser device is a combination laser illumination and pointing device.

23. A method comprising:
   providing electrical power to a plurality of diode lasers in an array to provide a corresponding plurality of laser beams;
   shaping the laser beams; and
   wherein a fast axis of each of the diode lasers is rotated with respect to the fast axis of each of the other diode lasers such that a far-field laser spot formed by all of the diode lasers appears more circular than a laser spot formed by one of the diode lasers.

24. A laser pointer comprising:
   a plurality of diode lasers for providing laser beams:
   a movable, substantially transparent window in a path of the laser beams; and
   a plurality of diffusers on the window that are positioned to vary a divergence of at least four of the laser beams substantially simultaneously when the window is moved, wherein the array of lasers comprises circular array of diode lasers or a linear array of diode lasers, and wherein a fast axis of each of the diode lasers is rotated with respect to the fast axis of each of the other diode lasers such that a far-field laser spot formed by all of the diode lasers appears more circular than a laser spot formed by one of the diode lasers.

* * * * *